United States Patent [19]

Karlock

[11] Patent Number: 4,970,583

[45] Date of Patent: Nov. 13, 1990

[54] COMBINED VIDEO PROCESSING CIRCUIT AND IMAGE ENHANCER

[76] Inventor: James A. Karlock, 3311 NE. 35th St., Portland, Oreg. 97212

[21] Appl. No.: 426,329

[22] Filed: Oct. 24, 1989

[51] Int. Cl.$^5$ ............................................. H04N 9/64
[52] U.S. Cl. ........................................ 358/27; 358/28; 358/37
[58] Field of Search .................... 358/27, 28, 37, 19

[56] References Cited

U.S. PATENT DOCUMENTS

| | | | |
|---|---|---|---|
| 3,877,067 | 4/1975 | Furrey | 358/27 |
| 4,030,121 | 6/1977 | Faroudja | 358/166 |
| 4,402,006 | 8/1983 | Karlock | 358/31 |
| 4,533,938 | 8/1985 | Hurst | 358/28 |
| 4,604,646 | 8/1986 | Karlock | 358/28 |
| 4,814,859 | 3/1989 | Kimura et al. | 358/27 |

FOREIGN PATENT DOCUMENTS 0161482  9/1983  Japan ........................ 358/27

Primary Examiner—James J. Groody
Assistant Examiner—Kimyen Vu
Attorney, Agent, or Firm—Dellett, Smith-Hill and Bedell

[57] ABSTRACT

A circuit for splitting a video signal into a chroma signal and a luminance signal comprises a resistor and a bandpass filter connected to the resistor. The bandpass filter passes a frequency component at the frequency of the color pilot burst. A chroma switch receives the frequency component passed by the bandpass filter, and is provided with a feedback transistor for reducing the input impedance of the chroma switch.

7 Claims, 4 Drawing Sheets

COMBINED VIDEO PROCESSING CIRCUIT AND IMAGE ENHANCER

BACKGROUND OF THE INVENTION

This invention relates to circuitry for adjusting the color level and burst phase of a television signal while also providing an aperture correction function.

Many video sources produce video which is deficient in either sharpness or color accuracy. The recently popular camcorder provides an ideal example of a device which frequently provides video that is lacking in sharpness, often with incorrect color hue or color saturation due to poor lighting conditions or the lack of proper maintenance. Often ordinary television broadcasts will likewise be off color and/or deficient in sharpness.

U.S. Pat. No. 4,604,646 entitled VIDEO PROCESSING CIRCUIT issued on Aug. 5, 1986 to the present applicant discloses a method and apparatus for adjusting the luminance level, chroma hue and chroma saturation of a video signal. U.S. Pat. No. 4,402,006 entitled IMAGE ENHANCER APPARATUS issued on Aug. 30, 1983 to the present applicant discloses a method and apparatus for adjusting the detail and sharpness of a video signal. While both of these devices were simpler and less costly than previous implementations, they are still relatively complex and costly circuits.

SUMMARY OF THE INVENTION

One object of the present invention is to provide unusually economic adjustment of chroma hue and chroma saturation.

A further object of the present invention is to provide an unusually economic means of improving the sharpness of a video signal.

A still further object of the present invention is to avoid sacrificing video signal quality due to cost tradeoffs.

Another object of the present invention is to reduce the space taken up by the processing device.

The foregoing objects are achieved by delaying the video signal before splitting the chroma and luminance. A high quality switch separates the chroma into its pilot burst and the active line components. These components are separately adjusted then recombined with the luminance component.

The undelayed video is applied through a chroma trap to an aperture corrector and a burst pulse generator. The aperture corrector output is summed with the chroma and luminance at the output amplifier. The burst pulse is used to control the chroma switch.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION OF A PREFERRED EMBODIMENT

Figure 1:
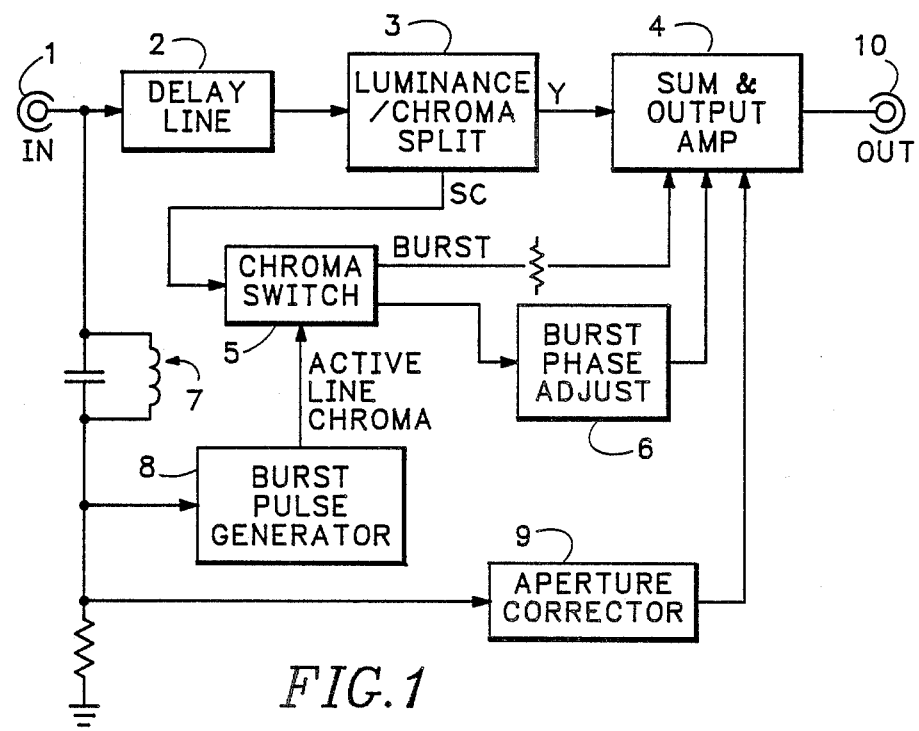
FIG. 1 is a block diagram of the preferred embodiment of the invention.
Figure 2A:
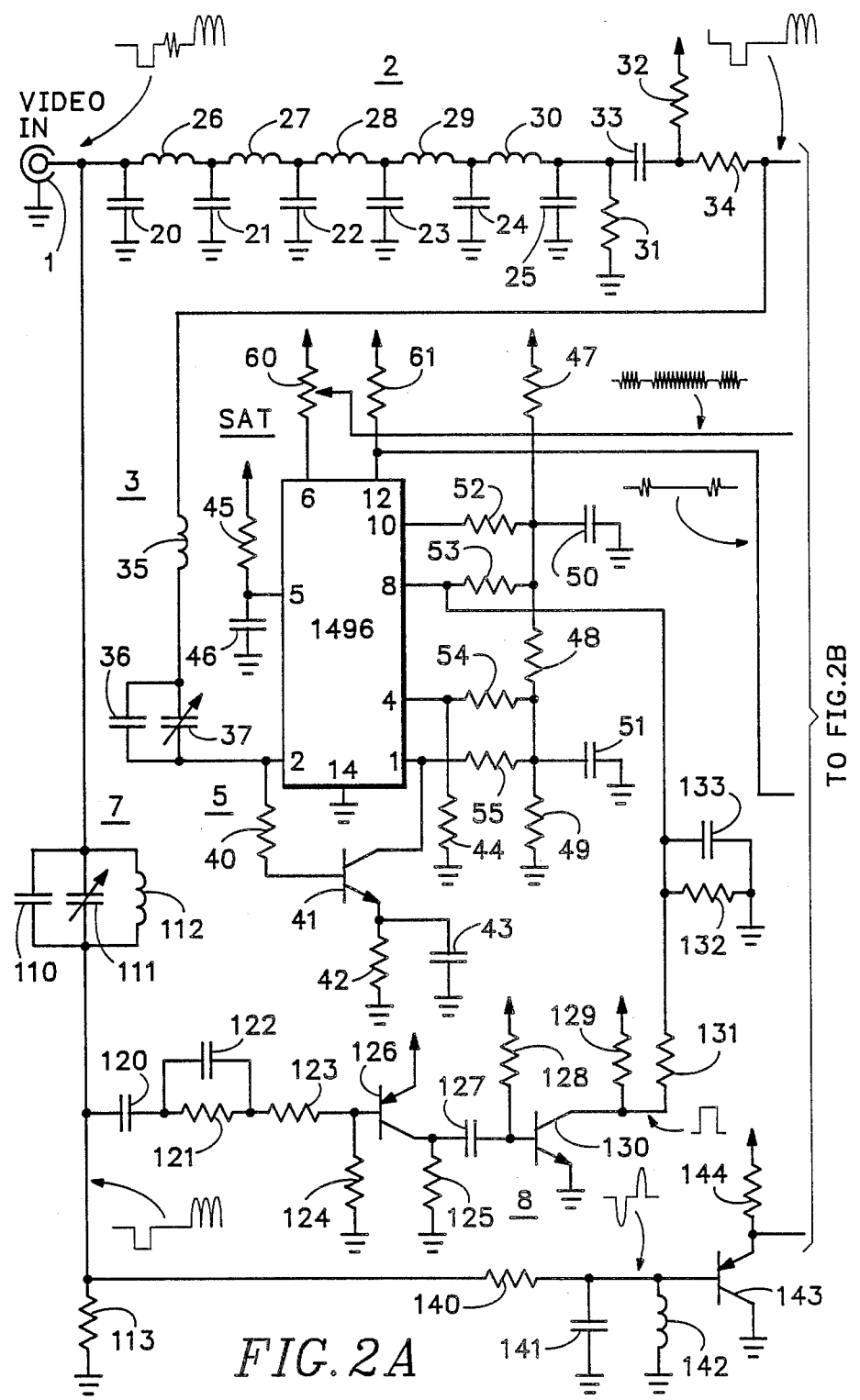
FIGS. 2A and 2B are a schematic diagram of the preferred embodiment of the invention.

Referring to FIGS. 1 and 2A, a video signal is received at terminal 1 over a 75 ohm coaxial cable and is applied to delay line 2. This delay line is of conventional design and comprises capacitors 20 through 25 and inductors 26 to 30, with the component values being chosen so that the delay line is suitably driven directly from the video input terminal 1 without an intervening amplifier. Resistors 31 and 32 provide the proper termination impedance for the delay line and hence also serve, in combination with resistor 113, to terminate the video input 1. Capacitor 33 couples the delay line output to the chroma/luminance splitter 3.

The chroma/luminance splitter 3 is composed of series resistor 34 whose output is shunted by a series tuned circuit composed of inductor 35 and capacitors 36, 37. Instead of being returned directly to ground, the series tuned trap is connected to a low impedance input (pin 2) of chroma switch 5. This input is an emitter of one of the input transistors within the type 1496 double balanced modulator IC which constitutes the chroma switch. This connection serves the dual purpose of trapping the chroma from the video and at the same time providing a current representative of the trapped chroma into pin 2 of the chroma switch 5. Since this input normally has only a moderately low input impedance, transistor 41 is provided to lower its input impedance. A low impedance is required at this point so that the chroma trap will remove sufficient chroma from the video. Resistor 40 connects pin 2 to the base of transistor 41. The collector of transistor 41 is connected to pin 1 of chroma switch 5 to provide negative feedback to pin 2 thus lowering the impedance at pin 2. Resistor 42 and capacitor 43, both connected from the emitter of transistor 41 to ground, allow transistor 41 to operate at full gain.

Although an analog IC, chroma switch 5 is fully switched by a pulse corresponding in time to the color pilot burst such that only the color pilot burst appears at output pin 12 and chroma without the color pilot burst appears at output pin 6. Resistors 47, 48 and 49 connected between the power supply and ground form a voltage divider to provide bias for the switch 5. Capacitors 50, 51 bypass the voltage divider while resistors 52 through 55 connect the voltage divider to the appropriate bias inputs of switch 5. Additional bias for switch 5 is provided by resistor 45 connected from the power supply to pin 5. Capacitor 46 bypasses pin 5. Resistor 44 provides a slight voltage offset to pin 4 so as to balance the voltage drop at complementary pin 1 which is caused by the current through transistor 41. Resistors 60 and 61 are the load resistors for pins 6 and 12 of chroma switch 5 with both being connected to the power supply. Color pilot burst only appears at pin 12 and chroma without color pilot burst appears on pin 6.

A saturation control is implemented by using a potentiometer for resistor 60 and taking the chroma from its movable terminal 60'. Chroma from terminal 60' is applied to the base of transistor 63 (FIG. 2B), resistor 64 being its emitter load resistor. Chroma from the emitter of transistor 63 is applied through coupling capacitor 65 to one end of resistor 68 and to one end of a correction network comprising the series connected combination of capacitor 66 and resistor 67.

A hue control function is provided by the burst phase adjust circuit 6 which shifts the phase of any color subcarrier routed through it. Since this circuit's input contains only the color pilot burst, it will only affect that part of the video signal. Two stages are used, the first of which provides a fixed phase shift to compensate for one-half of the phase shift of the second stage. This allows the overall circuit to provide either a leading or lagging phase shift.

Figure 2B:
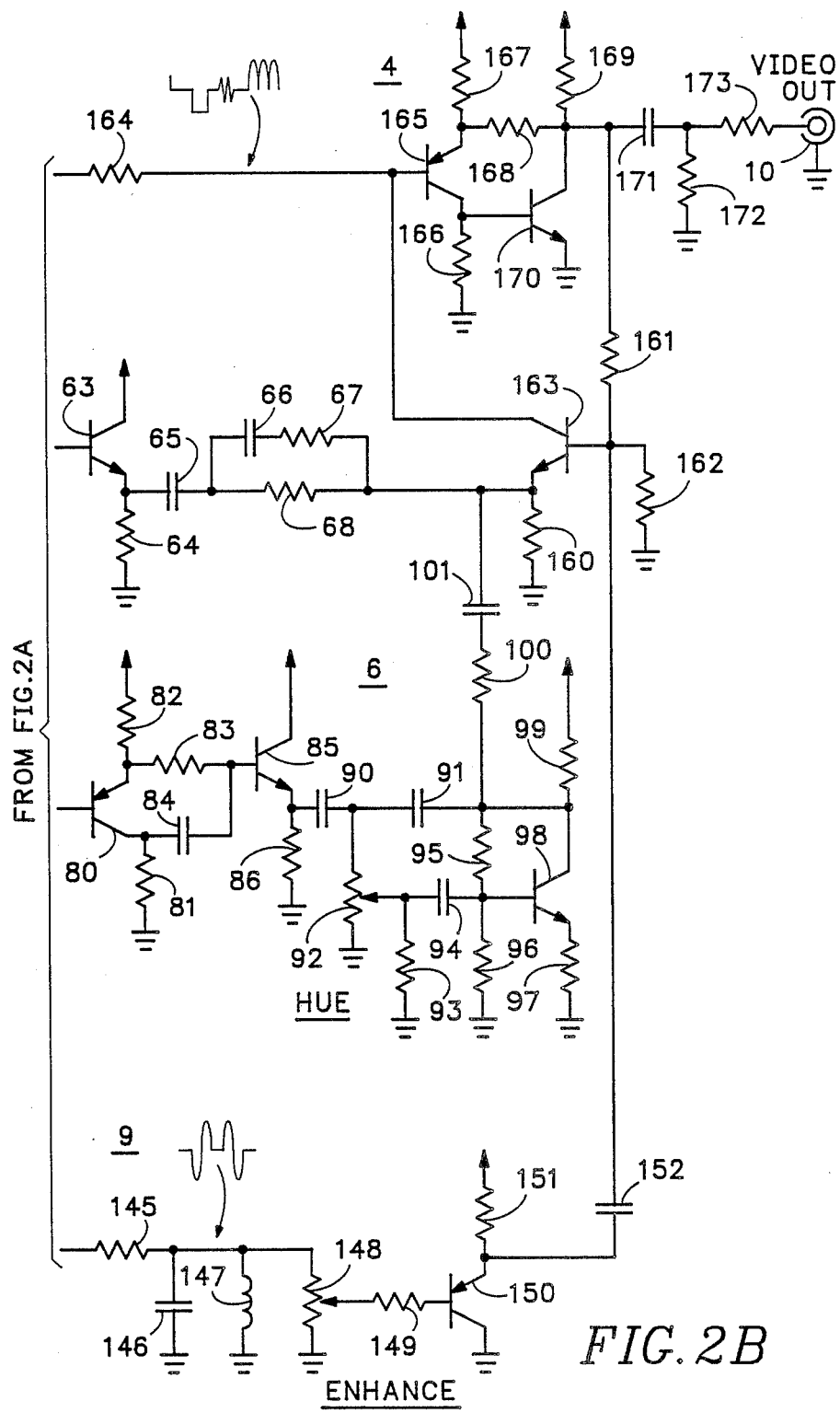
Figure 3A:
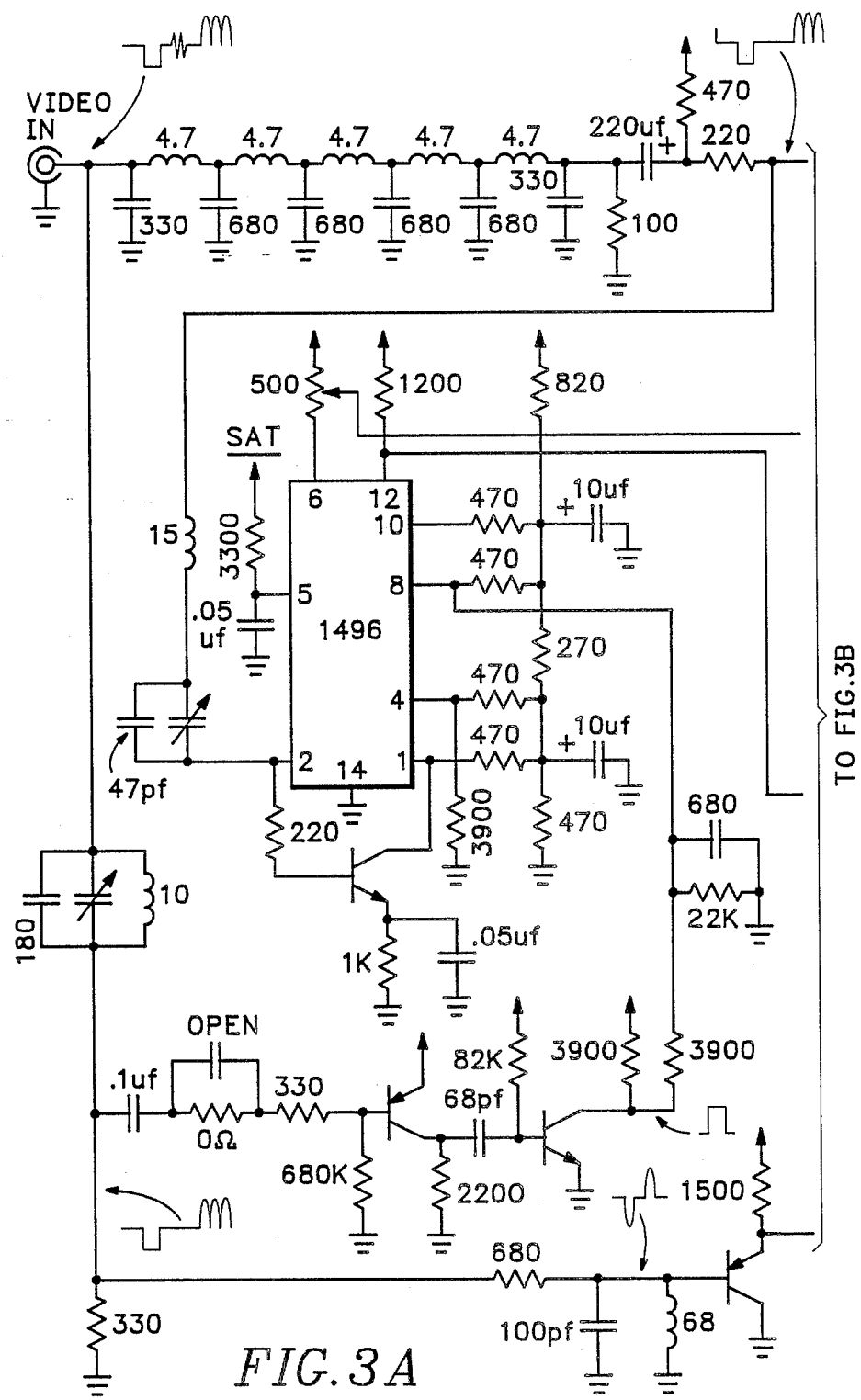
FIGS. 3A and 3B are the same as FIGS. 2A and 2B respectively with component values (ohms, picofarads, except where marked otherwise, and microhenries) indicated.
Figure 3B:
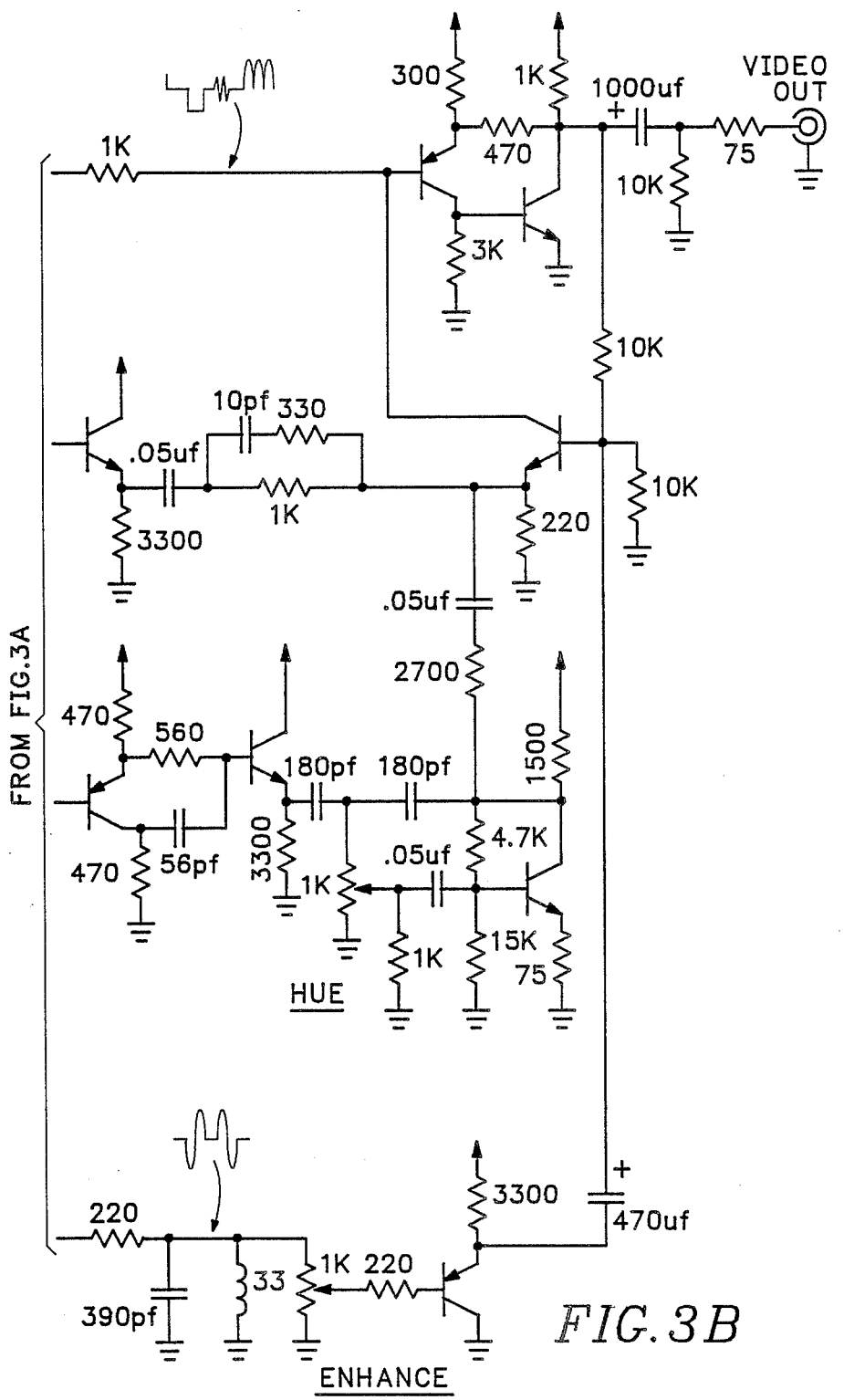

Color pilot burst appearing at pin 12 of switch 5 is applied to the base of phase splitter transistor 80 (FIG. 2B). Resistors 81 and 82 respectively bias the emitter and collector of transistor 80. The two out of phase outputs are combined by resistor 83 and capacitor 84 to form a well known all pass network which provides a phase shift without affecting signal amplitude. Capacitor 84 and resistor 83 are chosen to provide a fixed phase shift to compensate for the phase shift that occurs in the second phase shifting stage when the HUE control is set to its midposition. Transistor 85 and resistor 86 form an emitter follower to provide a low impedance drive for the following stage.

Transistor 98 and associated components 90 through 101 form an adjustable all-pass network which is used to shift the phase of the color pilot burst without significantly affecting its amplitude. A phase shifter of this type is described in U.S. Pat. No. 4,604,646. Color pilot burst from transistor 85 is coupled to output resistor 100 through capacitors 90 and 91 in series. Potentiometer 92, providing the color burst phase control, is interposed between the mid point of capacitors 90, 91 and ground, while the movable terminal of potentiometer 92 is returned to ground by means of linearizing resistor 93. Capacitor 94 couples the movable terminal of potentiometer 92 to the base of transistor 98 which is also connected to a voltage divider comprising resistors 95, 96 disposed between the collector of transistor 98 and ground. A resistor 99 connects the collector of transistor 98 to a positive voltage source and the emitter of transistor 98 is returned to ground by way of resistor 97.

This phase shift circuit has the further advantage of substantially linear control of the chroma or color burst phase-shift relative to rotation of the control potentiometer 92. The linearizing resistor 93 is connected between the movable terminal of the potentiometer and ground in this circuit, whereas such a linearizing resistor could not be positioned at this point should the control potentiometer 93 be located in the emitter circuit of the transistor, for example. Resistor 93 is readily selected in accordance with the value of potentiometer 92 so that a linearizing effect is achieved. In a particular circuit, the value of potentiometer 92 was 2K whereas the value of resistor 93 was 1K, but it should be understood that this is only by way of example. It will be understood that burst information is phase-shifted through transistor 98 with potentiometer 92 being used to adjust desired phase between extremes. The adjusted color burst information is applied to one end of resistor 100.

Input video is also applied to chroma trap 7, which is implemented as a tuned circuit composed of fixed capacitor 110, variable capacitor 111 and inductor 112 and serves the dual purpose of providing chroma free video to both the burst pulse generator 8 and the aperture corrector 9 as well as compensating for high frequency losses in the delay line 2. This compensation is achieved by selecting the Q of the tuned circuit and the load resistor 113 such that the frequency response at the input to the delay line has a rising characteristic to complement the high frequency rolloff within the delay line 2.

The series connection of capacitor 120 and resistors 121, 123 (with capacitor 122 shunting resistor 121) couple video from the chroma trap 7 to the base of the sync separator transistor 126. Capacitor 122 and resistor 121 are optional in order to improve sync separator performance during vertical sync. Resistor 124 biases transistor 126 such that it conducts only during sync pulses. Such conduction causes transistor 126 to provide positive sync pulses at its collector which is connected to ground through resistor 125. Components 127 through 130 form a well known "half-shot" multivibrator triggered by the trailing edge of sync which is well known to occur just before the start of the color pilot burst. Capacitor 127 and resistor 128 are chosen so that the output pulse ends just after the end of the color pilot burst. Thus, a burst gating pulse overlapping the time period of the color pilot burst appears at the collector of transistor 130 and is coupled to control pin 8 of chroma switch 5 by resistor 131 which is chosen to provide the proper drive voltage for that particular pin. Capacitor 133 rolls off the sharp edges on the color burst gating pulse to reduce unwanted transient pulses which may otherwise be produced by the chroma switch. Resistor 132 connected from control pin 8 to ground provides a small offset to the voltage on that pin so that the burst gating pulse is symmetrical about the mean voltage at that point.

Chroma trapped video is also applied to aperture corrector 9 (FIG. 2B). Like prior art aperture correctors, this circuit uses two differentiators in series to provide a second differential of the video signal. However, instead of using one or more complex delay lines consisting of many inductors and many capacitors, or RC circuits which generally perform poorly, this circuit uses only a single resistor, a single inductor and a single capacitor for each differentiating stage. This is achieved by choosing the Q and resonant frequency of each stage so that it provides a single pulse with a minimum of ringing in response to a step input. The need for amplification before the first differentiating operation is avoided by using a somewhat high impedance in the first stage and incorporating the source impedance as part of the Q. The need for amplification after the second differentiating operation is avoided by using a relatively low impedance and incorporating resistor 148 as part of the Q of the second stage. Conversely, if a low impedance source is available to drive the first differentiating stage, then the first stage can be low impedance which allows the input of the second stage to be connected directly to the output of the first stage without the need for amplification between the two differentiating stages, i.e., resistor 145 could be connected directly to inductor 42. There would still be no need for amplification after the second stage.

Chroma free video from the chroma trap 7 is applied to the first differentiating stage, which consists of resistor 140, capacitor 141 and inductor 142. The junction of 140, 141 and 142 is connected to the base of emitter follower transistor 143 which provides a low impedance drive for the second differentiating stage and has emitter load resistor 144 connected to the power supply. The emitter of transistor 143 supplies first differentiated video to inductor 147 (FIG. 2B), capacitor 146 and potentiometer 148 through resistor 145. Potentiometer 148 provides a means of adjusting the amount of high frequency boost applied to the video and has its output terminal connected to the base of emitter follower transistor 150. The emitter of transistor 150 is connected through resistor 151 to the power supply. Capacitor 152 couples the twice differentiated video from transistor 150 to the output stage 4.

If it is deemed desirable to use coring, any of several well known coring circuits may be inserted between the emitter of transistor 143 and resistor 145 or between resistor 145 and potentiometer 148.

Output stage 4 consists of a well known two transistor feedback pair composed of transistors 165, 170 and resistors 166 through 169. Coupling of the video to the output terminal 10 is provided by capacitor 171 and resistor 173 with resistor 172 keeping the DC average voltage at the output terminal at a ground level. An additional transistor 163 provides both a current summing input (at its emitter) and a voltage inverting input (at its base) to the above mentioned two transistor pair as well as DC feedback to stabilize the operating point. A voltage divider formed by resistors 161, 162 provides a voltage representative of the output voltage to the base of transistor 163 whose collector is connected to the base of transistor 165 which is the input of the two transistor pair and whose emitter is biased by resistor 160 which is connected to ground. This feedback through transistor 163 serves to keep the output DC voltage constant.

Twice differentiated video is applied to the base of transistor 163 through capacitor 152 which is chosen to be large enough to prevent output video from appearing on the base of transistor 163 as such a condition would reduce the gain of the output stage due to negative feedback. Chroma is applied to the emitter of transistor 163 from resistors 67, 68 while color pilot burst is similarly applied through capacitor 101. The above described chroma components and the twice differentiated video result in a collector current through transistor 163 that is representative of those signals. Resistor 164 serves to couple chroma free video from the chroma/luminance splitter into the two transistor feedback pair at the base of transistor 165. Additionally current from transistor 163 is turned into a voltage across resistor 164, by resistor 164, so as to reinsert the chroma components into the video signal and likewise to insert the twice differentiated video into said video.

Figure 4A:
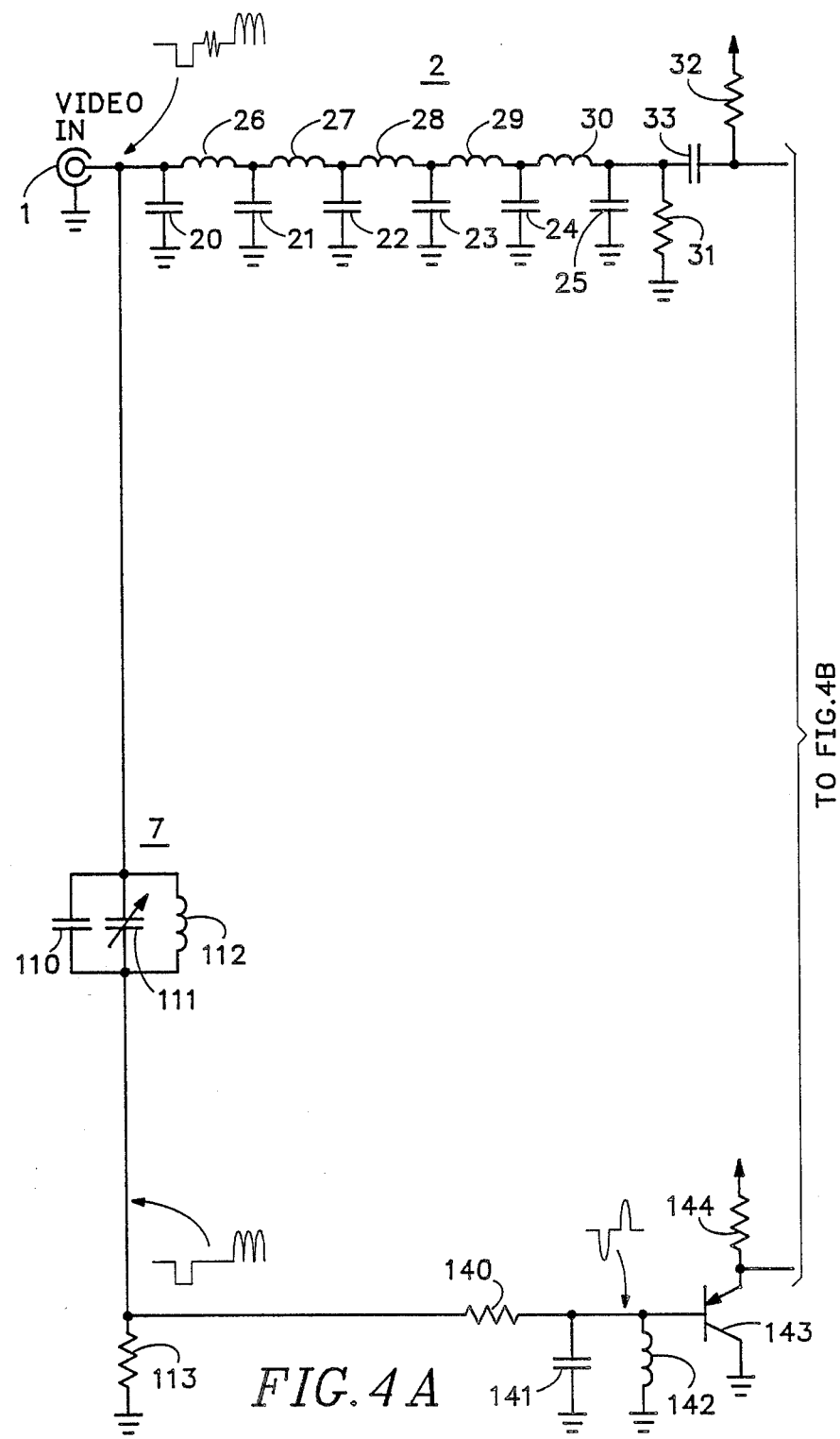
FIG. 4 is a schematic diagram of a second embodiment of the invention.
Figure 4B:
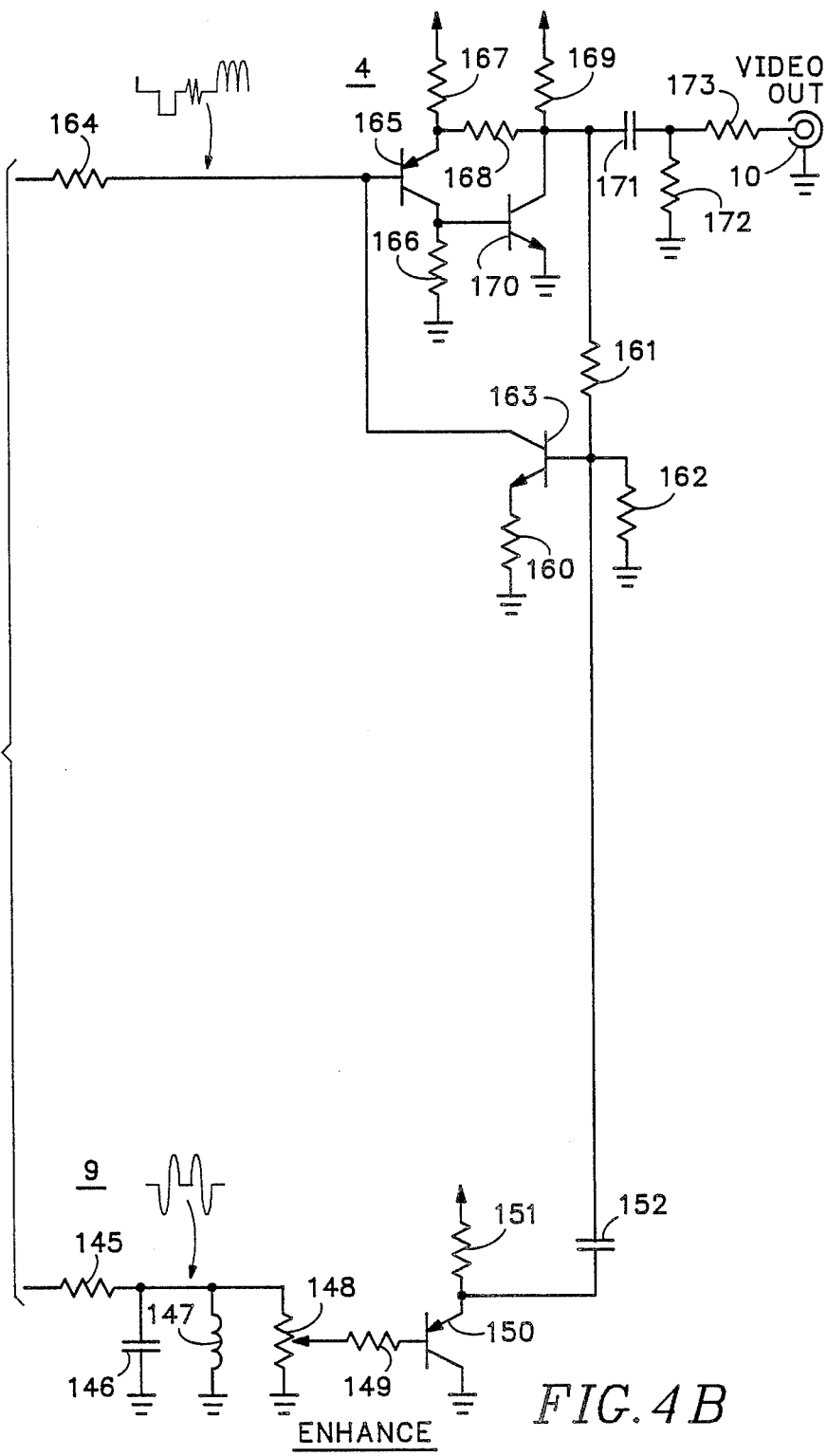

If the chroma adjustment features are not required, those parts of the circuit that relate only to chroma may be removed, resulting in the circuit of FIG. 4 which uses identical reference numbers to those in FIGS. 2A and 2B. All features of FIG. 4 have been previously described during the discussion of FIGS. 1 and 2A and 2B. Similarly, if one desires only the chroma adjustment features, then parts 140 through 151 may be omitted while grounding one end of capacitor 152.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A circuit for splitting a video signal having a color pilot burst, a chroma component and a luminance component into a chroma signal and a luminance signal, comprising:
   a resistor,
   a bandpass filter connected to the resistor, the bandpass filter passing a frequency component at the frequency of the color pilot burst,
   a chroma switch for receiving the frequency component passed by the bandpass filter, and
   means for reducing the input impedance of the chroma switch.

2. A circuit according to claim 1, wherein the chroma switch separates the frequency component at the frequency of the color pilot burst into a signal that contains only the color pilot burst and a signal that does not contain the color pilot burst.

3. A circuit according to claim 2, comprising means for processing and recombining the signal that contains only the color pilot burst and the signal that does not contain the color pilot burst.

4. A circuit for processing a video signal having a color pilot burst, said video signal being applied to an input terminal of said circuit, which comprises:
   a resistor,
   a bandpass filter connected to the resistor, the bandpass filter passing a frequency component at the frequency of the color pilot burst,
   a delay line connected directly between the input terminal and the resistor, and
   load resistor means at the end of the delay line further from the input terminal.

5. A circuit for processing a video signal received at an input terminal thereof, comprising:
   a first differentiator comprising a resistor, a capacitor and an inductor and having an input terminal and an output terminal, the input terminal of the first differentiator being connected to the input terminal of the circuit without interposition of an amplifier,
   a second differentiator comprising a resistor, a capacitor and an inductor and having an input terminal and an output terminal, the input terminal of the second differentiator being connected to the output terminal of the first differentiator.

6. A circuit according to claim 5, having an output terminal for providing a processed video signal, the output terminal of the circuit being connected to the output terminal of the second differentiator through an adjustable control element, and the output terminal of the second differentiator being connected to the adjustable control element without interposition of an amplifier.

7. A circuit for processing a video signal, having a color pilot burst, said circuit comprising:
   (a) means for separating a frequency component at the frequency of the color pilot burst into a first signal that contains only the color pilot burst and a second signal that does not contain the color pilot burst,
   (b) means for selectively processing at least one of the first and second signals,
   (c) means for providing a third signal representative of the video signal twice differentiated with respect to time,
   (d) output means having an input terminal and an output terminal, and
   (e) a transistor having its base connected to receive the third signal and the signal present at said output terminal, its emitter connected to receive the first and second signals, and its collector connected to said input terminal.

* * * * *